UNITED STATES PATENT OFFICE.

MYRTIL KAHN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

BROWN COLORING-MATTER.

946,052.

No Drawing.

Specification of Letters Patent. Patented Jan. 11, 1910.

Application filed May 18, 1909. Serial No. 496,843.

*To all whom it may concern:*

Be it known that I, MYRTIL KAHN, doctor of philosophy, chemist, citizen of the German Empire, residing at Elberfeld, Germany, have invented new and useful Improvements in Brown Coloring-Matter, of which the following is a specification.

My invention relates to the manufacture and production of new brown disazo dye-stuffs which can be obtained by combining the tetrazo compounds of meta-diaminodiphenylurea with one molecule of a meta-aminophenol sulfonic acid and with one molecule of any other azo dyestuff component. The dyes thus obtained are in the shape of their alkaline salts brown powders soluble in water with a brown color; upon reduction with stannous chlorid and hydrochloric acid they are decomposed, carbonic acid, meta-phenylenediamin, diaminophenol sulfonic acid and an amin being obtained. They are valuable brown substantive dyestuffs, which possess an extraordinary affinity for cotton. They can be developed after dyeing with diazotized para-nitranilin. In this way very full brown shades are obtained, which can be discharged a splendid white with discharging agents. The fastness to washing of these shades is very good. In order to illustrate the new process more fully the following example is given, the parts being by weight :24.2 parts of meta-diaminodiphenylurea are dissolved in 1200 parts of water and 100 parts of a 30 per cent. hydrochloric acid. It is then diazotized in the usual manner with a solution of 14 parts of sodium nitrate in 500 parts of water. A solution of 18.9 parts of meta-aminophenol sulfonic acid ($NH_2:OH:SO_3H = 1:3:6$) in water is quickly added which solution contains an excess of sodium carbonate. The intermediate compound separates out. Its formation is complete after a short time. Subsequently an aqueous solution of 11 parts of resorcin is added to the mass of the reaction which is then stirred for about 10–12 hours. The dye is salted out, filtered off and dried. It is, after being dried and pulverized, in the shape of its sodium salt a brown powder soluble in hot water with a yellowish-brown color and soluble in concentrated sulfuric acid with a yellowish-brown color; upon reduction with stannous chlorid and hydrochloric acid the dye is split up into carbonic acid, meta-phenylenediamin, diaminophenol sulfonic acid and aminoresorcin. It dyes cotton brown shades which after combination with diazotized para-nitranilin on the fiber change into yellowish-brown shades fast to washing and leaving after being discharged a pure white.

The process is carried out in an analogous manner on using other of the above mentioned components, *e. g.* another meta-aminophenol sulfonic acid such as the meta-aminophenol disulfonic acid ($NH_2:OH:SO_3H:SO_3H = 1:3:4:6$), or other second components such as meta-aminophenol, chloro-meta-phenylenediamin ($NH_2:NH_2:Cl = 1:3:4$), meta-toluylenediamin, meta-phenylenediamin etc.

I claim :

1. The herein-described new disazo dyestuffs obtainable from meta-diaminodiphenylurea, a meta-aminophenol sulfonic acid and a suitable azo dyestuff component, which dyestuffs are, after being dried and pulverized, in the shape of their alkaline salts brown powders soluble in hot water with a brown color; yielding upon reduction with stannous chlorid and hydrochloric acid carbonic acid, meta-phenylenediamin, diaminophenol sulfonic acid and an amin; and dyeing cotton brown shades, which after being developed on the fiber with diazotized para-nitranilin are fast to washing, leaving after being discharged a pure white, substantially as described.

2. The herein-described new disazo dyestuff obtainable from meta-diaminodiphenylurea, meta-aminophenol sulfonic acid and resorcin, which dyestuff is, after being dried and pulverized, in the shape of its sodium salt a brown powder soluble in hot water with a yellowish-brown color and soluble in concentrated sulfuric acid with a brownish-red color; yielding upon reduction with stannous chlorid and hydrochloric acid carbonic acid, meta-phenylenediamin, diaminophenol sulfonic acid and aminoresorcin; and dyeing cotton brown shades, which after being developed on the fiber with diazotized para-nitranilin change into yellowish-brown shades fast to washing and leaving after being discharged a pure white, substantially as described.

In testimony whereof I have hereunto set my hand in the presence of two subscribing witnesses.

MYRTIL KAHN. [L. S.]

Witnesses:
OTTO KÖNIG,
C. J. WRIGHT.

Correction in Letters Patent No. 946,052.

It is hereby certified that in Letters Patent No. 946,052, granted January 11, 1910, upon the application of Myrtil Kahn, of Elberfeld, Germany, for an improvement in "Brown Coloring-Matter," an error appears in the printed specification requiring correction as follows: Page 1, line 87, the word "nitrate" should read *nitrite;* and that the said Letters Patent should be read with this correction therein that the same may conform to the record of the case in the Patent Office.

Signed and sealed this 8th day of March, A. D., 1910.

[SEAL.]

C. C. BILLINGS,
*Acting Commissioner of Patents.* sorcin; and dyeing cotton brown shades, which after being developed on the fiber with diazotized para-nitranilin change into yellowish-brown shades fast to washing and leaving after being discharged a pure white, substantially as described.

In testimony whereof I have hereunto set my hand in the presence of two subscribing witnesses.

MYRTIL KAHN. [L. S.]

Witnesses:
OTTO KÖNIG,
C. J. WRIGHT.

---

Correction in Letters Patent No. 946,052.

It is hereby certified that in Letters Patent No. 946,052, granted January 11, 1910, upon the application of Myrtil Kahn, of Elberfeld, Germany, for an improvement in "Brown Coloring-Matter," an error appears in the printed specification requiring correction as follows: Page 1, line 87, the word "nitrate" should read *nitrite;* and that the said Letters Patent should be read with this correction therein that the same may conform to the record of the case in the Patent Office.

Signed and sealed this 8th day of March, A. D., 1910.

[SEAL.]

C. C. BILLINGS,
*Acting Commissioner of Patents.*

It is hereby certified that in Letters Patent No. 946,052, granted January 11, 1910, upon the application of Myrtil Kahn, of Elberfeld, Germany, for an improvement in "Brown Coloring-Matter," an error appears in the printed specification requiring correction as follows: Page 1, line 37, the word "nitrate" should read *nitrite;* and that the said Letters Patent should be read with this correction therein that the same may conform to the record of the case in the Patent Office.

Signed and sealed this 8th day of March, A. D., 1910.

[SEAL.]

C. C. BILLINGS,
*Acting Commissioner of Patents.*